(12) United States Patent
Saitoh et al.

(10) Patent No.: US 6,891,616 B2
(45) Date of Patent: May 10, 2005

(54) POLARIZATION ANALYZER USING A PLURALITY OF FARADAY ROTATORS

(75) Inventors: Takanori Saitoh, Zama (JP); Shigeru Kinugawa, Tokyo (JP)

(73) Assignee: Anritsu Corporation, Tokyo (JP)

( * ) Notice: Subject to any disclaimer, the term of this patent is extended or adjusted under 35 U.S.C. 154(b) by 223 days.

(21) Appl. No.: 10/397,797

(22) Filed: Mar. 26, 2003

(65) Prior Publication Data

US 2003/0184751 A1 Oct. 2, 2003

(30) Foreign Application Priority Data

Mar. 28, 2002 (JP) .................................. 2002-093176

(51) Int. Cl.[7] .................................................. G01N 4/00
(52) U.S. Cl. ........................ 356/368; 356/365; 250/225
(58) Field of Search ............................... 356/364–368; 250/225

(56) References Cited

U.S. PATENT DOCUMENTS 4,306,809 A * 12/1981 Azzam ........................ 356/368
4,681,450 A * 7/1987 Azzam ........................ 356/367

* cited by examiner

Primary Examiner—Layla Lauchman
(74) Attorney, Agent, or Firm—Frishauf, Holtz, Goodman & Chick, P.C.

(57) ABSTRACT

Faraday rotators each have a Faraday element which rotates light and a magnetic field generator for applying a magnetic field to the Faraday element. A wavelength plate is disposed between the Faraday rotators and it retards the light. A polarizer transmits, of the light, light having a predetermined plane of polarization which has been rotated by the Faraday rotators and retarded by the wavelength plate. An optical receiver receives the light transmitted by the polarizer and outputs a light receiving signal which corresponds to the amount of light received. A signal generator outputs a control signal for polarizing the light to be measured into at least four polarization states to the magnetic field generator. A signal processor determines Stokes parameters which indicate the polarization state of the light to be measured based on the four polarization states, and the light receiving signal corresponding to each of the four polarization states.

25 Claims, 4 Drawing Sheets

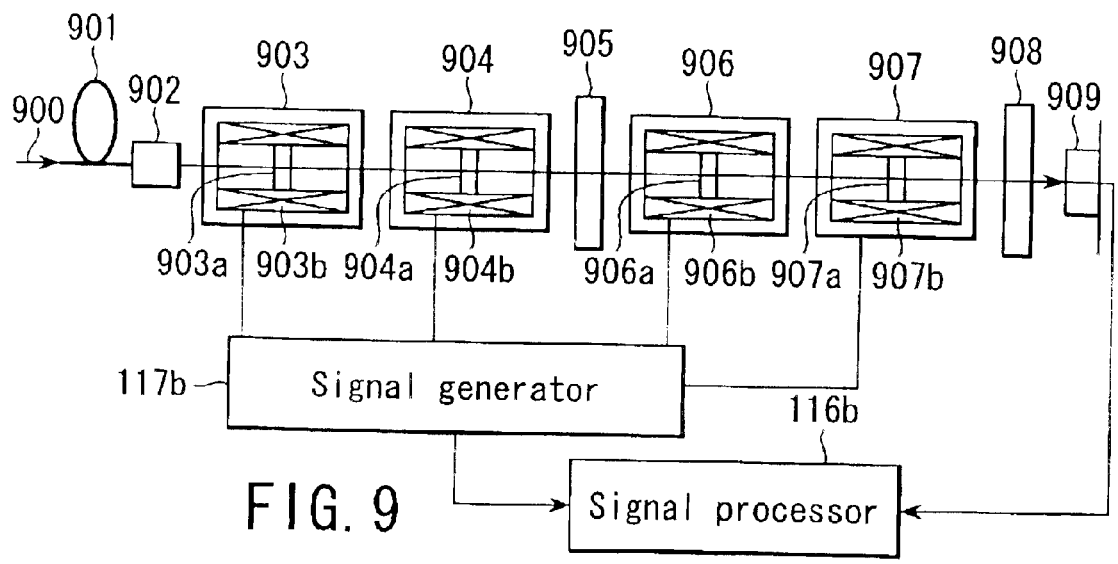
FIG. 9
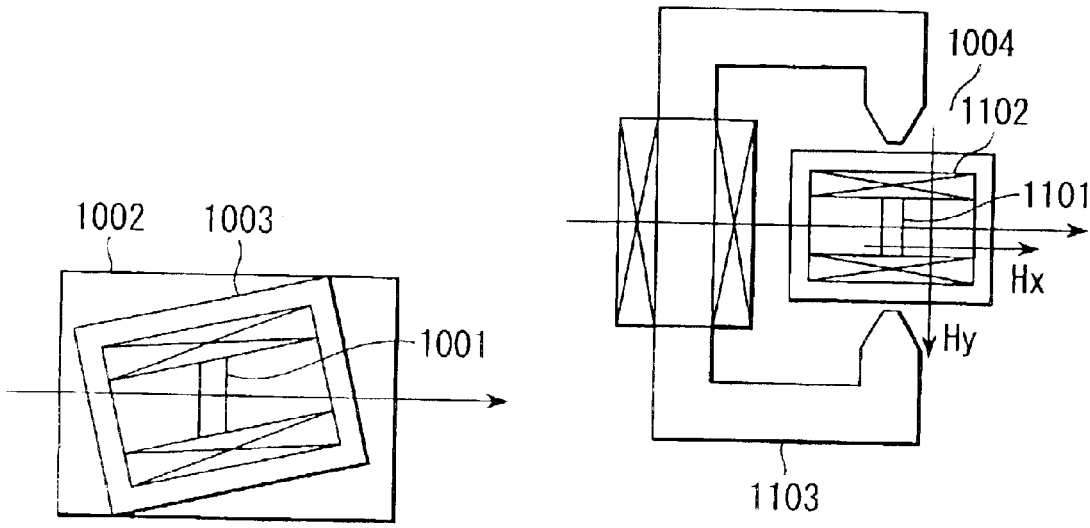
FIG. 10
FIG. 11

POLARIZATION ANALYZER USING A PLURALITY OF FARADAY ROTATORS

CROSS-REFERENCE TO RELATED APPLICATIONS

This application is based upon and claims the benefit of priority from the prior Japanese Patent Application No. 2002-093176, filed Mar. 28, 2002, the entire contents of which are incorporated herein by reference.

BACKGROUND OF THE INVENTION

1. Field of the Invention

The present invention relates to a polarization analyzer for use in fields of optical communication such as wavelength division multiplexing (WDM) and optical measuring, and more particularly, to a polarization analyzer which uses a plurality of Faraday rotators to measure the polarization state of incident light with high precision and high speed.

2. Description of the Related Art

As is generally known, the overall communication speed of wavelength division multiplexing (WDM) communication is increasing at a high speed year after year due to application of broadband to the communication speed of each of the channels, and also due to the widening of the space between the channels.

As broadband application increases, and the widening of the space between the channels progresses, cross-talk between the channels in WDM has become a problem.

A polarization interleave method in which the light diffused to all the channels is subjected to linear polarization, and the planes of polarization between the adjacent channels are shifted by 90° with respect to each other, has been proposed as a method for reducing cross talk in this type of WDM communication, and development of this method is currently being carried out.

In WDM communication using this polarizing interleave method, it is necessary for the polarization properties of the optical components and the optical transmission paths to be accurately determined in advance.

The polarization properties of the optical components and the like for use in WDM communication is determined by checking the polarization of incident light and the polarization of emitted light and by measuring the changes in these polarizations.

A space analysis method and a time analysis method are two methods generally used as methods for measuring the polarization state of light.

As shown in FIG. 3, the space analysis method is a method in which incident light 300 is split and each light is subjected to a device having the known polarization properties, and the Stokes parameters S0, S1, S2 and S3 which indicate the polarization state of the incident light 300 is estimated from this amount of light.

That is to say, in FIG. 3, the incident light 300 is split in to four light beams which are light beam 304, light beam 305, light beam 306, and light beam 307 using beam splitter 301, beam splitter 302, and polarizing beam splitter 303.

Here, after the light beam 304 is transmitted through a λ/4 plate 308 and a polarizer 309 having an orientation of 45 degrees, the light is received at an optical receiver 310.

Also, the light beam 305 is received at the optical receiver 312 after being transmitted with the polarizer 311 having an orientation of 45 degrees.

The light beam 306 and the light beam 307 which have been split with the polarizing beam splitter 303 are respectively transmitted through a 0° and 90° polarizer, and are respectively directly received by an optical receiver 313 and an optical receiver 314.

In addition, the Stokes parameters S0, S1, S2 and S3 which indicate the polarization state of the incident light 300 can be estimated from the light amounts of each receiving signal of each of the optical receiver 310, the optical receiver 312, the optical receiver 313, the optical receiver 314.

Meanwhile, as shown in FIG. 4, the time analysis method is a method in which incident light 400 is transmitted in sequence through a λ/2 plate 401, a λ/4 plate 402 and a polarizer 403, and by measuring the amount of light transmitted at an optical receiver 404, the Stokes parameters S0, S1, S2 and S3 which indicate the polarization state of the incident light 400 can be estimated.

At this time, the orientation angle of the λ/2 plate 401, the λ/4 plate 402 and the polarizer 403 must be carefully measured a number of times, and the Stokes parameters S0, S1, S2 and S3 which indicate the polarization state of the incident light 400 can be estimated from the relationship between each orientation angle and the amount of light transmitted.

Incidentally, in the space analysis method, because the incident light can be subjected to a plurality of polarization rotations simultaneously, and the Stokes parameters S0, S1, S2 and S3 which indicate the polarization state of the incident light 300 can be measured speedily.

However, in this space analysis method, because accurately measuring the divergence ratio at the time of divergence of the light is difficult, the Stokes parameters S0, S1, S2 and S3 which are obtained have poor accuracy, and also the amount of light received by each one of the optical receivers is decreased because of the divergence of the light, and there is the problem that there is a tendency for measurement sensitivity to be reduced.

Meanwhile, in the time analysis method, because there is no light divergence, the measuring sensitivity is good, but because it uses a method in which the wavelength plate and the polarizer are mechanically rotated, this mechanical rotation takes time. Therefore, there is the problem that speedy measurement of the Stokes parameters S0, S1, S2 and S3 which indicate the polarization state of the incident light 400 is difficult.

BRIEF SUMMARY OF THE INVENTION

An object of the present invention is to provide a polarization analyzer in which speedy measurement of Stokes parameters which indicate the polarization state of light to be measured is made possible while maintaining high sensitivity and high accuracy, by non-mechanical rotation using a Faraday rotator which is rotated by the magnetic field applied to the Faraday element.

That is to say, the present invention basically realizes a polarization analyzer that has a structure based on the time analysis method and makes possible high speed measurement of Stokes parameters which indicate the polarization state of light to be measured, while maintaining high sensitivity and high accuracy by rotating the polarization of the light to be measured with a magnetic field using a Faraday rotator to transmit light to be measured to a Faraday element having the Faraday effect, rather than the conventional method of mechanically rotating a wavelength plate or the like as the method for carrying out the polarization rotation.

In order to achieve the above object, according to a first aspect of the present invention, there is provided a polarization analyzer comprising:

a plurality of Faraday rotators (103, 105) which are serially disposed on an optical axis onto which light to be measured is incident, and each have a Faraday element (108, 109) which rotates the light to be measured and a magnetic field generator (112, 115) which applies a magnetic field to the Faraday element;

a wavelength plate (104) which is disposed between the plurality of Faraday rotators, and retards the light to be measured;

a polarizer (106) which transmits, of the light to be measured, light having a predetermined plane of polarization, which has been rotated by the plurality of Faraday rotators, and retarded by the wavelength plate;

an optical receiver (107) which receives the light transmitted by the polarizer and outputs a light receiving electric signal in accordance with the amount of light received;

a signal generator (117) which outputs a control signal for polarizing the light to be measured into at least four polarization states to the magnetic field generator; and a signal processor (116) which determines Stokes parameters which indicate the polarization state of the light to be measured based on the four polarization states, and the light receiving electric signal from the optical receiver corresponding to each of the four polarization states.

In order to achieve the above object, according to a second aspect of the present invention, there is provided a polarization analyzer according to the first aspect, wherein the signal generator outputs control signals having sufficient strength to apply to each Faraday element, a magnetic field not smaller than the saturation magnetic field of each Faraday element built in the plurality of Faraday rotators, in the plurality of Faraday rotators via the magnetic field generator.

In order to achieve the above object, according to a third aspect of the present invention, there is provided a polarization analyzer according to the first aspect, wherein the signal generator outputs control signals having sufficient strength to apply to each Faraday element, a magnetic field whose direction is parallel to the optical axis or opposite to the parallel direction thereof, and which is not smaller than the saturation magnetic field of each Faraday element built in the plurality of Faraday rotators, in the plurality of Faraday rotators via the magnetic field generator, and thus each rotational angle of the plurality of Faraday rotators is limited to multiples of a Faraday angle of each Faraday element.

In order to achieve the above object, according to a fourth aspect of the present invention, there is provided a polarization analyzer according to the first aspect, wherein the direction of a magnetic field which is applied from a magnetic field generator (1003) to a Faraday element (1001) built in at least one (1002) of the plurality of Faraday rotators is disposed so as to be inclined at a predetermined angle which is parallel to the optical axis.

In order to achieve the above object, according to a fifth aspect of the present invention, there is provided a polarization analyzer according to the first aspect, wherein the at least one of the plurality of Faraday rotators is formed as a rotation magnetic field type Faraday rotator (1004).

In order to achieve the above object, according to a sixth aspect of the present invention, there is provided a polarization analyzer according to the fifth aspect, wherein the rotation magnetic field type Faraday rotator includes a Faraday element (1101), a horizontal magnetic field generator coil (1102) which applies a magnetic field from a horizontal direction to the Faraday element, and a vertical magnetic field generator coil (1103) which applies a magnetic field from a vertical direction to the Faraday element, and by adjusting the magnetic field from the horizontal direction and the magnetic field from the vertical direction, rotation is possible in the direction of the combined magnetic field.

In order to achieve the above object, according to a seventh aspect of the present invention, there is provided a polarization analyzer comprising:

first and second Faraday rotators (103, 105) which are serially disposed on an optical axis onto which light to be measured is incident, and each have a Faraday element (108, 109) which rotates the light to be measured and a magnetic field generator (112, 115) which applies a magnetic field to the Faraday element;

a wavelength plate (104) which is disposed between the first and second Faraday rotators, and retards the light to be measured;

a polarizer (106) which transmits, of the light to be measured, light having a predetermined plane of polarization, which has been rotated by the first and second Faraday rotators, and retarded by the wavelength plate;

an optical receiver (107) which receives the light transmitted by the polarizer and outputs a light receiving electric signal in accordance with the amount of light received;

a signal generator (117) which outputs a control signal for polarizing the light to be measured into at least four polarization states to the magnetic field generator; and a signal processor (116) which determines Stokes parameters which indicate the polarization state of the light to be measured, based on the four polarization states, and the light receiving electric signal from the optical receiver corresponding to each of the four polarization states.

In order to achieve the above object, according to an eighth aspect of the present invention, there is provided a polarization analyzer according to the seventh aspect, wherein the signal generator outputs control signals having sufficient strength to apply to each Faraday element, a magnetic field not smaller than the saturation magnetic field of each Faraday element built inside the first and second Faraday rotators, in the first and second Faraday rotators via the magnetic field generator.

In order to achieve the above object, according to a ninth aspect of the present invention, there is provided a polarization analyzer according to the seventh aspect, wherein the signal generator outputs control signals having sufficient strength to apply to each Faraday element, a magnetic field whose direction is parallel to the optical axis or opposite to the parallel direction thereof and is not smaller than the saturation magnetic field of each Faraday element built in the two Faraday rotators in the first and second Faraday rotators via the magnetic field generator, and thus each rotational angle of the first and second Faraday rotators is limited to multiples of a Faraday angle of each Faraday element.

In order to achieve the above object, according to a tenth aspect of the present invention, there is provided a polarization analyzer according to the seventh aspect, wherein the signal generator includes a rectangular wave signal generator (110), a phase retarder (113), an amplifier (112) for a first Faraday rotator, and an amplifier (114) for a second Faraday rotator, a rectangular wave voltage signal having a predetermined frequency which is generated from the rectangular wave signal generator is split into a first rectangular wave voltage signal and a second rectangular wave voltage signal, the first rectangular wave voltage signal after being amplified at the amplifier for the first Faraday rotator is applied to a first Faraday rotator magnetic field generator coil as the magnetic field generator which is built in the first Faraday rotator, the second rectangular wave voltage signal after being amplified at the amplifier for the second Faraday rotator via the phase retarder which carries out a 90° phase retardation, is applied to a second Faraday rotator magnetic field generator coil which is built in the second Faraday rotator.

In order to achieve the above object, according to an eleventh aspect of the present invention, there is provided a polarization analyzer according to the seventh aspect, wherein the direction of a magnetic field which is applied from a magnetic field generator (1003) to a Faraday element (1001) built in at least one (1002) of the first and second Faraday rotators is disposed so as to be inclined at a predetermined angle which is parallel to the optical axis.

In order to achieve the above object, according to a twelfth aspect of the present invention, there is provided a polarization analyzer according to the seventh aspect, wherein the at least one of the first and second Faraday rotators is formed as a rotation magnetic field type Faraday rotator (1004).

In order to achieve the above object, according to a thirteenth aspect of the present invention, there is provided polarization analyzer according to the twelfth aspect, wherein the rotation magnetic field type Faraday rotator includes a Faraday element (1101), a horizontal magnetic field generator coil (1102) which applies a magnetic field from a horizontal direction to the Faraday element, and a vertical magnetic field generator coil (1103) which applies a magnetic field from a vertical direction to the Faraday element, and by adjusting the magnetic field from the horizontal direction and the magnetic field from the vertical direction, rotation is possible in the direction of the combined magnetic field.

In order to achieve the above object, according to a fourteenth aspect of the present invention, there is provided a polarization analyzer comprising:

first, second and third Faraday rotators (803, 804, 806) which are serially disposed on an optical axis onto which light to be measured is incident, and each have a Faraday element (803*a*, 804*a*, 806) which rotates the light to be measured and a magnetic field generator (803*b*, 804*b*, 806*b*) which applies a magnetic field to the Faraday element;

a wavelength plate (805) which is disposed between the second and third Faraday rotators, and retards the light to be measured;

a polarizer (807) which transmits, of the light to be measured, light having a predetermined plane of polarization, which has been rotated by the first, second and third Faraday rotators, and retarded by the wavelength plate;

an optical receiver (808) which receives the light transmitted by the polarizer and outputs a light receiving electric signal in accordance with the amount of light received;

a signal generator (117*a*) which outputs a control signal for polarizing the light to be measured into at least four polarization states to the magnetic field generator; and a signal processor (116*a*) which determines Stokes parameters which indicate the polarization state of the light to be measured, based on the four polarization states, and the light receiving electric signal from the optical receiver corresponding to each of the four polarization states.

In order to achieve the above object, according to a fifteenth aspect of the present invention, there is provided a polarization analyzer according to the fourteenth aspect, wherein the signal generator outputs control signals having sufficient strength to apply to each Faraday element, a magnetic field not smaller than the saturation magnetic field of each Faraday element built in the first, second and third Faraday rotators, in the first, second and third Faraday rotators via the magnetic field generator.

In order to achieve the above object, according to a sixteenth aspect of the present invention, there is provided a polarization analyzer according to the fourteenth aspect, wherein the signal generator outputs control signals having sufficient strength to apply to each Faraday element, a magnetic field whose direction is parallel to the optical axis or opposite to the parallel direction thereof, and which is not smaller than the saturation magnetic field of each Faraday element built in the Faraday rotators in the first, second and third Faraday rotators, in the first, second and third Faraday rotators via the magnetic field generator, and thus each rotational angle of the first second and third Faraday rotators is limited to multiples of a Faraday angle of each Faraday element.

In order to achieve the above object, according to a seventeenth aspect of the present invention, there is provided a polarization analyzer according to the fourteenth aspect, wherein the direction of a magnetic field which is applied from a magnetic field generator (1003) to a Faraday element (1001) built in at least one (1002) of the first, second and third Faraday rotators is disposed so as to be inclined at a predetermined angle which is parallel to the optical axis.

In order to achieve the above object, according to an eighteenth aspect of the present invention, there is provided a polarization analyzer according to the fourteenth aspect, wherein the at least one of the first, second and third Faraday rotators is formed as a rotation magnetic field type Faraday rotator (1004).

In order to achieve the above object, according to a nineteenth aspect of the present invention, there is provided a polarization analyzer according to the eighteenth aspect, wherein the rotation magnetic field type Faraday rotator includes a Faraday element (1101), a horizontal magnetic field generator coil (1102) which applies a magnetic field from a horizontal direction to the Faraday element, and a vertical magnetic field generator coil (1103) which applies a magnetic field from a vertical direction to the Faraday element, and by adjusting the magnetic field from the horizontal direction and the magnetic field from the vertical direction, the direction of the combined magnetic field can be rotated.

In order to achieve the above object, according to a twentieth aspect of the present invention, there is provided a polarization analyzer comprising:

first, second, third and fourth Faraday rotators (903, 904, 906, 907) which are serially disposed on an optical axis onto which light to be measured is incident, and each have a Faraday element (903*a*, 904*a*, 906*a*, 907*a*) which rotates the light to be measured and a magnetic field generator (903*b*, 904*b*, 906*b*, 907*b*) which applies a magnetic field to the Faraday element;

a wavelength plate (905) which is disposed between the second and third Faraday rotators, and retards the light to be measured;

a polarizer (908) which transmits, of the light to be measured, light having a predetermined plane of polarization, which has been rotated by the first, second, third and fourth Faraday rotators, and retarded by the wavelength plate;

an optical receiver (909) which receives the light transmitted by the polarizer and outputs a light receiving electric signal in accordance with the amount of light received;

a signal generator (117a) which outputs a control signal for polarizing the light to be measured into at least four polarization states to the magnetic field generator; and a signal processor (116a) which determines Stokes parameters which indicate the polarization state of the light to be measured, based on the four polarization states, and the light receiving electric signal from the optical receiver corresponding to each of the four polarization states.

In order to achieve the above object, according to a twenty-first aspect of the present invention, there is provided a polarization analyzer according to the twentieth aspect, wherein the signal generator outputs control signals having sufficient strength to apply to each Faraday element, a magnetic field not smaller than the saturation magnetic field of each Faraday element built in the first, second, third and fourth Faraday rotators, in the first, second, third and fourth Faraday rotators via the magnetic field generator.

In order to achieve the above object, according to a twenty-second aspect of the present invention, there is provided a polarization analyzer according to the twentieth aspect, wherein the signal generator outputs control signals having sufficient strength to apply to each Faraday element, a magnetic field whose direction is parallel to the optical axis or opposite to the parallel direction thereof, and which is not smaller than the saturation magnetic field of each Faraday element built in the Faraday rotators in the first, second, third and fourth Faraday rotators in the first, second, third and fourth Faraday rotators via the magnetic field generator, and thus each rotational angle of the first second and third and fourth Faraday rotators is limited to multiples of a Faraday angle of each Faraday element.

In order to achieve the above object, according to a twenty-third aspect of the present invention, there is provided a polarization analyzer according to the twentieth aspect, wherein the direction of a magnetic field which is applied from a magnetic field generator (1003) to a Faraday element (1001) built in at least one (1002) of the first, second, third and fourth Faraday rotators is disposed so as to be inclined at a predetermined angle which is parallel to the optical axis.

In order to achieve the above object, according to a twenty-fourth aspect of the present invention, there is provided a polarization analyzer according to the twentieth aspect, wherein the at least one of the first, second, third and fourth Faraday rotators is formed as a rotation magnetic field type Faraday rotator (1004).

In order to achieve the above object, according to a twenty-fifth aspect of the present invention, there is provided a polarization analyzer according to the twenty-fourth aspect, wherein the rotation magnetic field type Faraday rotator includes a Faraday element (1101), a horizontal magnetic field generator coil (1102) which applies a magnetic field from a horizontal direction to the Faraday element, and a vertical magnetic field generator coil (1103) which applies a magnetic field from a vertical direction to the Faraday element, and by adjusting the magnetic field from the horizontal direction and the magnetic field from the vertical direction, rotation is possible in the direction of the combined magnetic field.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

DESCRIPTION OF THE SEVERAL VIEWS OF THE DRAWING

The accompanying drawings, which are incorporated in and constitute a part of the specification, illustrate presently preferred embodiment of the invention, and together with the general description given above and the detailed description of the preferred embodiment given below, serve to explain the principles of the invention.

FIG. 9 is a block diagram showing a structure of an optical system of a polarization analyzer using 4 Faraday rotators according to a third embodiment of the present invention.

FIG. 10 shows a Faraday rotator which applies a magnetic field in a direction inclined from a direction parallel to an optical axis, according to another embodiment of the present invention.

FIG. 11 shows a type of rotator which applies a rotation magnetic field according to another embodiment of the present invention.

DETAILED DESCRIPTION OF THE INVENTION

Figure 1:
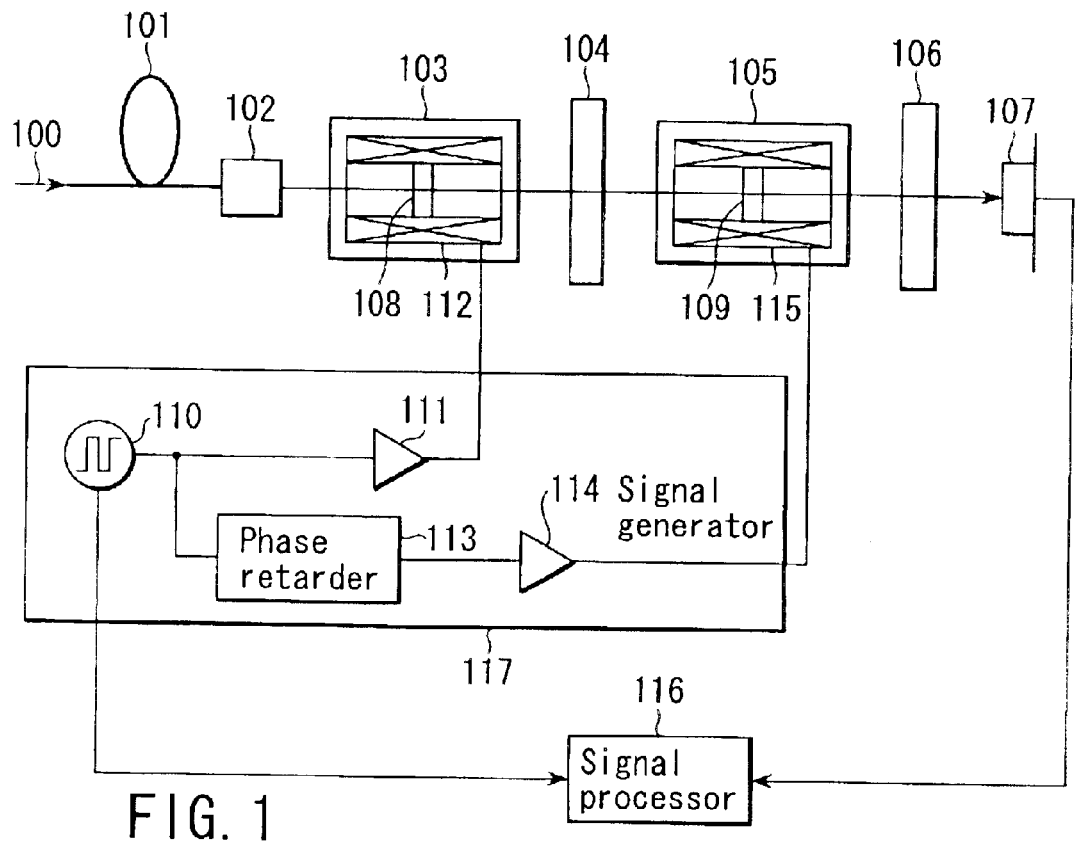
FIG. 1 is a block diagram showing a structure of a first embodiment of a polarization analyzer according to the present invention.

Reference will now be made in detail to the presently preferred embodiments of the invention as illustrated in the accompanying drawings, in which like reference numerals designate like or corresponding parts.

The following is a detailed description of embodiments of a polarization analyzer of the present invention with reference to the accompanying drawings.

(First Embodiment)

FIG. 1 is a block diagram showing a structure of a first embodiment of a polarization analyzer according to the present invention.

That is to say, as shown in FIG. 1, light to be measured 10 which is entered by a fiber 10 is collimated by a collimator lens 102, and after being transmitted through a first Faraday rotator 103, a wavelength plate 104, a second Faraday rotator 105 and a polarizer 106, is received at an optical receiver 107.

Here the first and second Faraday rotator 103 and 105 have respectively incorporated therein a Faraday element 108 for a first Faraday rotator having a Faraday angle of 22.5°, a Faraday element 109 for a second Faraday rotator, a first Faraday rotator magnetic field generator coil (magnetic field generator) 112, and a second Faraday rotator magnetic field generator coil (magnetic field generator) 115.

The Faraday elements 108 and 109 for the first and second Faraday rotators depend on the strength of a magnetic field which is applied from the first and second Faraday rotator magnetic field generator coils (magnetic field generators) 112 and 115 to the Faraday elements 108 and 109 and thereby change the optical properties of the Faraday elements 108 and 109.

Figure 5:
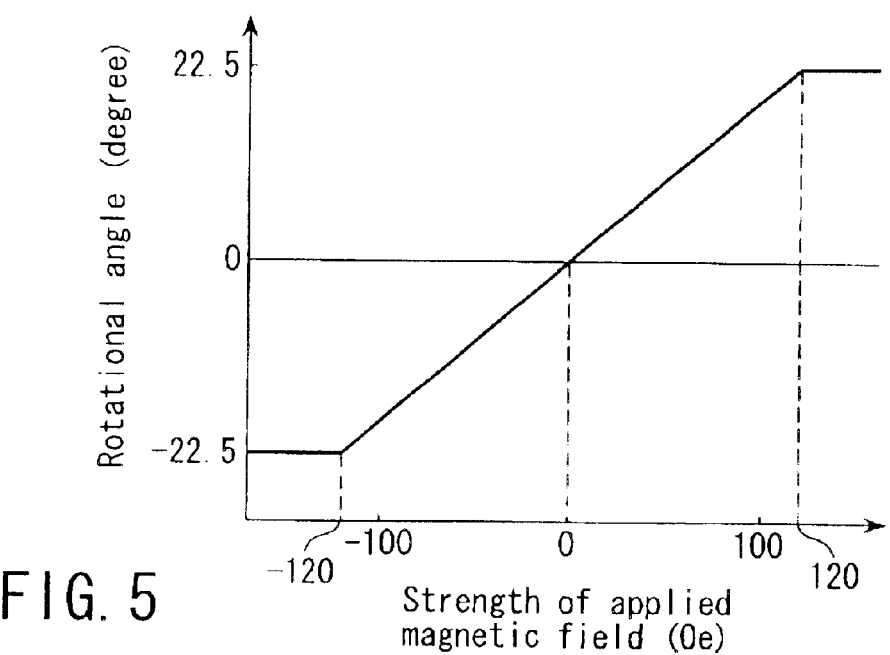
FIG. 5 is a characteristic curve for explaining dependency of an applied magnetic field on an angle of rotation by a Faraday element for use in the first embodiment of the present invention.

Namely, in the case where the strength of the magnetic field applied to the Faraday elements 108 and 109 is not more than the saturation magnetic field of the Faraday elements 108 and 109, the rotational angle at which light to be measured (diffusing light) is rotated by the Faraday elements 108 and 109, has a value which proportionates to the strength of the applied magnetic field as shown in FIG. 5 which will be described below.

Also, the structure of an inner magnetic wall Faraday elements 108 and 109 changes depending on the strength of the magnetic field applied to the Faraday elements 108 and 109.

Figure 6:
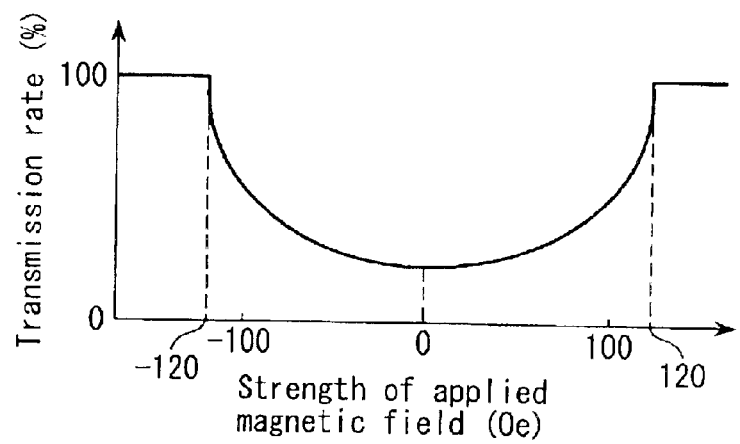
FIG. 6 is a characteristic curve for explaining dependency of an applied magnetic field on transmission rate of the Faraday element for use in the first embodiment of the present invention.

In other words, because the diffusing light is diffused in accordance with the inner magnetic wall of the Faraday elements 108 and 109, the transmission rate of the diffusion light, has a value which depends on the strength of the magnetic field as shown in FIG. 6 which will be described below.

In addition, in the case where the strength of the magnetic field applied to the Faraday elements 108 and 109 is greater than the saturation magnetic field of the Faraday elements 108 and 109, the above-mentioned rotational angle has a fixed value which does not depend on the strength of the magnetic field as is shown in FIG. 5 which will be described below.

This fixed angle which will be the rotational angle is called a Faraday angle.

Also, in the case where the strength of the magnetic field applied to the Faraday elements 108 and 109 is greater than the saturation magnetic field of the Faraday elements 108 and 109, because the Faraday elements 108 and 109 are magnetically saturated, the above-mentioned magnetic wall structure dissipates and thus the above-mentioned transmission rate has a fixed value which is not dependent on the strength of the magnetic field as shown in FIG. 6 which will be described below.

FIG. 5 is a characteristic curve showing the relationship between the magnetic field applied to the Faraday elements 108 and 109 as described above and the angle of rotation at which the light to be measured (diffusing light) is rotated.

FIG. 6 is a characteristic curve for showing the relationship between the magnetic field applied to the Faraday elements 108 and 109 as described above and the transmission rate of the diffusing light.

In this example, Faraday elements having a saturation magnetic strength of 120 (Oe) and Faraday angle of 22.5 are used as the Faraday elements 108 and 109.

Accordingly, in this example, in the case where a magnetic field having a strength of 120 (Oe) or more is applied, it can be seen from the FIGS. 5 and 6 that the transmission rate and the rotational angle by the Faraday elements 108 and 109 both have a fixed value.

When a magnetic field having a strength not smaller than the saturation magnetic field is applied to the Faraday elements 108 and 109, the fact that the transmission rate and the rotational angle of the Faraday elements 108 and 109 have fixed values (and do not depend on the magnetic field) is extremely useful in improving the measuring accuracy as a polarization analyzer as is described hereinafter.

A signal generator 117 of FIG. 1 includes a rectangular signal generator 110, a phase retarder 113, an amplifier 111 for a first Faraday rotator, and an amplifier 114 for a first Faraday rotator in this embodiment.

The signal generator 117, as described hereinafter, controls rotational angles $\theta$ and $\phi$ of the first and second Faraday rotators 103, 105 and it is suffices for a control signal which polarizes the light to be measured 100 in four polarization states to be output to the magnetic field generators 112 and 115.

That is to say, preferably, the signal generator 117 should output to the magnetic field generators 112 and 115 a control signal whose strength is sufficient to apply to each of the Faraday elements 108 and 109, a magnetic field which is not smaller than the saturation magnetic field of each Faraday element 108 and 109 which are built in the two Faraday rotators 103 and 105, via the magnetic field generators 112 and 115.

Accordingly, the signal generator 117 is not limited to the structure described above, and may for example not use the phase retarder 113, but rather 2 of the rectangular signal generators.

In addition, the rectangular voltage signal having a frequency of f which is generated from the rectangular wave signal generator 110 of the signal generator 117 branches into a first rectangular wave voltage signal and a second rectangular voltage signal.

After the first rectangular wave voltage signal is amplified at the amplifier 111 for the first Faraday rotator, it is applied to the first Faraday rotator magnetic field generator coil (magnetic field generator) 112 which is built in the first Faraday rotator 103.

When the polarization analysis of the light 100 to be measured is to be carried out, if the transmission rate is fixed, the Stokes parameters which indicate the polarization state of the light 100 to be measured can be computed easily and highly accurately.

For that reason, in order for the amplification of the rectangular wave magnetic field generated at the first Faraday rotator magnetic field generator coil (magnetic field generator) 112 to have a strength exceeding the saturation magnetic field of the Faraday element 108 for the first Faraday rotator as described above, adjustments are carried out by the control signal from the signal generator 117.

Figure 2A:
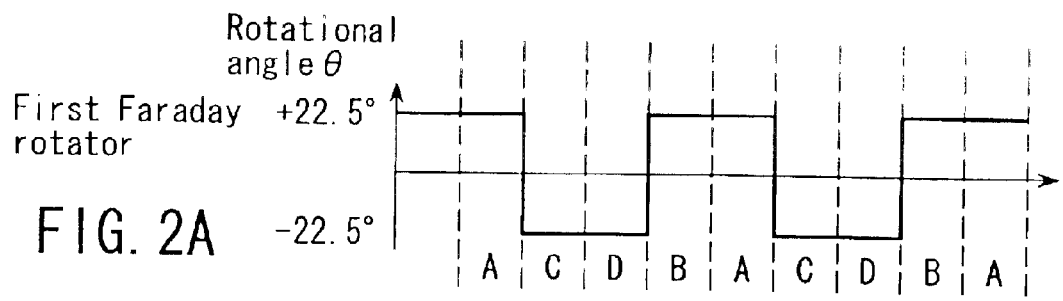
FIGS. 2A and 2B are charts respectively showing rotational angles of two Faraday rotators that are used in the polarization analyzer of the present invention.

Accordingly, the rotational angle of the first Faraday rotator 103 changes to a rectangular wave form having an amplitude of ±22.5° and a frequency of f as shown in FIG. 2A.

Also, the transmission rate of the first Faraday rotator 103 is always at the fixed value of 100% as shown in FIG. 6.

Figure 7:
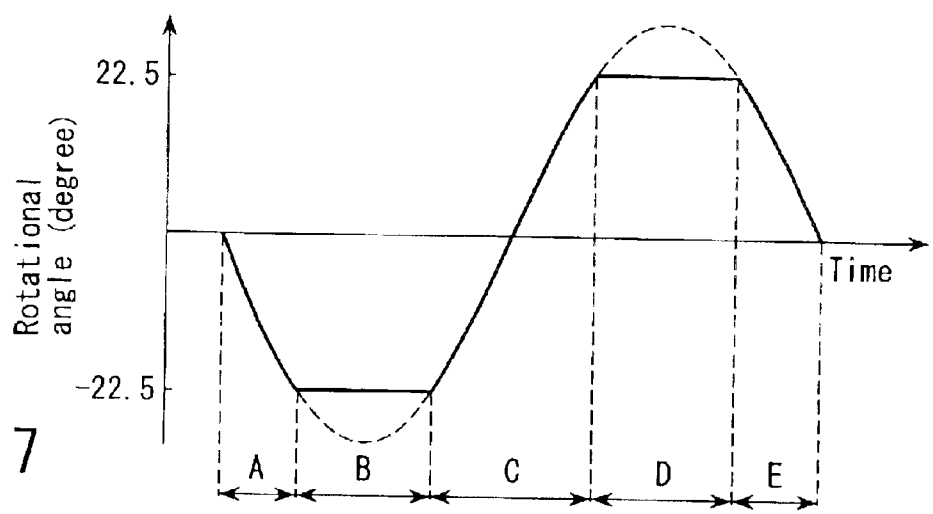
FIG. 7 is a curve for explaining a rotational angle in the case where a sine wave magnetic field is applied to the Faraday element for use in the first embodiment of the present invention.

It is to be noted that as a sine wave form, the aforementioned rectangular wave voltage signal is a wave form of a magnetic field generated at the first rotator magnetic field generator coil (magnetic field generator) 112 as shown in FIG. 7, and even if the amplitude thereof is not smaller than the saturation magnetic field of the Faraday element, as shown in the time regions B and D, the rotational angle can be formed in a state such that the amplitude is a fixed value of ±22.5°.

From the measured value of these time regions B and D it is possible to estimate the Stokes parameters which indicate the polarization state of the light 100 to be measured.

However, in the other time regions A, C and E, the rotational angle changes depending on the magnetic field strength.

Also, in this case, as shown in FIG. 6, because the transmission rate too changes depending on the magnetic field strength, estimation of the Stokes parameters which indicate the polarization state of the light 100 to be measured from the measured value obtained in these regions is difficult, and in reality this is waste of time.

As a result, in the case where the wave form of the magnetic field is rectangular as shown in FIG. 2A, it can be said to be most effective waveform since there are no useless time regions (A, C, E) seen in the sine wave magnetic field as shown in FIG. 7.

Meanwhile, after the second rectangular wave voltage signal is amplified at the amplifier 114 for the second Faraday rotator via the phase retarder 113 which carries out a 90° phase retardation, it is applied to the second Faraday rotator magnetic field generator coil (magnetic field generator) 115 which is built in the second Faraday rotator 105.

The amplitude of the rectangular wave magnetic field generated at this second Faraday rotator magnetic field generator coil (magnetic field generator) 115 is adjusted by the control signal from the signal generator 117 such that strength exceeds the saturation magnetic field of the Faraday element 109 for the second Faraday rotator.

Accordingly, the rotational angle of the second Faraday rotator 105 is, as shown in FIG. 2 changed to a rectangular waveform (the rectangular waveform having a phase retardation of 90° with respect to the rectangular waveform showing the rotational angle of the first Faraday rotator 103 shown in FIG. 2A) having an amplitude of ±22.5° and a frequency f.

Next, the light amount received by the optical receiver 107 will be explained.

The rotational angle of the first Faraday rotator 103 is made θ.

Also, the transmission rate of the first Faraday rotator 103 at that time is T1(θ) which is dependent on the rotational angle θ.

Similarly, the rotational angle of the second Faraday rotator 105 is made φ.

Further, the transmission rate of the second Faraday rotator 105 at that time is T2(φ) which is dependent on the rotational angle φ.

The transmission rate of the wavelength plate 104 is made Tq and the retardation is Δ.

Here retardation refers to the phase difference of two light components having different polarization directions, of light that is transmitted through an anisotropic crystal.

Also, the polarizer 106 is a complete polarizer, and the incline of the optical axis of the wavelength plate 104 with respect to the optical axis thereof is α.

The Mueller matrix for the first Faraday rotator 103, the wavelength plate 104, the second Faraday rotator 105, and the polarizer 106 respectively are $R_\theta$, Q, $R_\phi$ and P, and the Mueller matrix A for the entire polarization analyzer is given in the Equation (1).

$$A = PR_\phi Q R_\theta \quad (1)$$

$$= \frac{1}{2}\begin{bmatrix} 1 & 1 & 0 & 0 \\ 1 & 1 & 0 & 0 \\ 0 & 0 & 0 & 0 \\ 0 & 0 & 0 & 0 \end{bmatrix} \cdot T_2(\phi) \begin{bmatrix} 1 & 0 & 0 & 0 \\ 0 & \cos 2\phi & -\sin 2\phi & 0 \\ 0 & \sin 2\phi & \cos 2\phi & 0 \\ 0 & 0 & 0 & 1 \end{bmatrix}.$$

$$T_q \begin{bmatrix} 1 & 0 & 0 & 0 \\ 0 & P & Q & -S \\ 0 & Q & R & T \\ 0 & S & -T & U \end{bmatrix} \cdot T_1(\theta) \begin{bmatrix} 1 & 0 & 0 & 0 \\ 0 & \cos 2\theta & -\sin 2\theta & 0 \\ 0 & \sin 2\theta & \cos 2\theta & 0 \\ 0 & 0 & 0 & 1 \end{bmatrix}$$

$P = 1 - (1 - \cos\Delta)\sin^2 2\alpha$ $Q = (1 - \cos\Delta)\sin 2\alpha \cos 2\alpha$ $R = 1 - (1\cos\Delta)\cos^2 2\alpha$ $S = \sin\Delta \sin 2\alpha$ $T = \sin\Delta \cos 2\alpha$ $U = \cos\Delta$ The Stokes parameter of the incident light and the emitted light respectively are Si, S' j (i, j=0, 1, 2, 3) and S' O, that is the amount of light received at the optical receiver 107 is represented in the Equation (2) from the Equation (1).

$$S'_0 = \frac{T_2(\phi)T_q T(\theta)}{2}\big[S_0 + \{(P\cos 2\phi - Q\sin 2\phi)\cos 2\theta + \quad (2)$$

$$(Q\cos 2\phi - R\sin 2\phi)\sin 2\theta\} S_1 +$$

$$\{-(P\cos 2\phi - Q\sin 2\phi)\sin 2\theta +$$

$$(Q\cos 2\phi - R\sin 2\phi)\cos 2\theta\} S_2 -$$

$$(S\cos 2\phi + T\sin 2\phi)S_3\big]$$

Here, the Stokes parameters Si (i=0, 1, 2, 3) which indicate the polarization state of the incident light can be determined if φ, θ, α, Δ, T2(φ), T1(θ) and Tq are known and if the 4 independent equations (2) are given.

Namely, the angles of rotation θ and φ by Faraday elements 108 and 109 for the first and second Faraday rotators are changed, and the light to be measured is controlled such that four kinds of polarization states are caused, and the amount of light transmitted at this time can be measured. That is, if the S' O of the four independent equations (2) are determined, the Stokes parameters Si (i=0, 1, 2, 3) which indicate the polarization state of the light to be measured from these values.

As shown in FIG. 6, in the case where a magnetic field not larger than the saturated magnetic field is applied to the Faraday element, the transmission rate of the Faraday element is extremely dependent on the strength of the magnetic field and changes accordingly.

However, as shown in FIG. 6, in the case where a magnetic field not smaller than the saturated magnetic field is applied to the Faraday element, the transmission rate of the Faraday element does not transmission rate of the Faraday element does not depend of the strength of the magnetic field and the value is fixed.

The rotational angle at the time when a magnetic field not smaller than the saturation magnetic field is applied to the Faraday element in a parallel direction with respect to the light being transmitted (that is the Faraday angle) is $\xi_+$ and the rotational angle when it is applied in a direction opposite to the parallel direction is $\xi_-$ and the relationship between these rotational angles $\xi_+$ and $\xi_-$ is that of Equation (3).

$$\xi_+ = -\xi_- \quad (3)$$

The Faraday angle of each of the Faraday elements 108 and 109 used in this embodiment is 22.5° in both the Faraday element 108 for the first Faraday rotator and the Faraday element 109 for the second Faraday rotator.

Figure 2B:
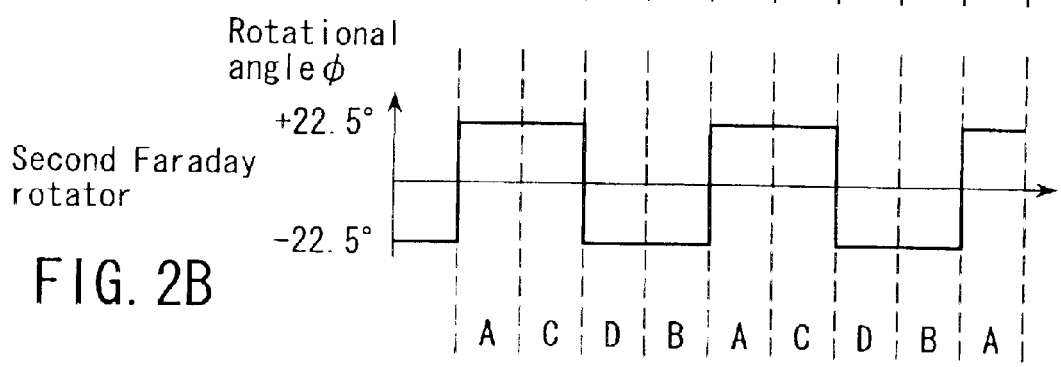
Figure 3:
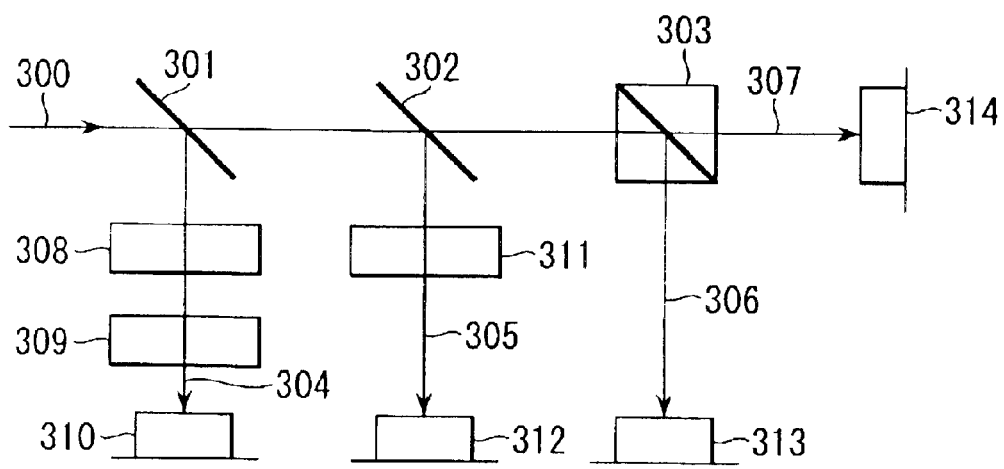
FIG. 3 is a block diagram for explaining a space analysis method conventionally used in a polarization analyzer.
Figure 4:
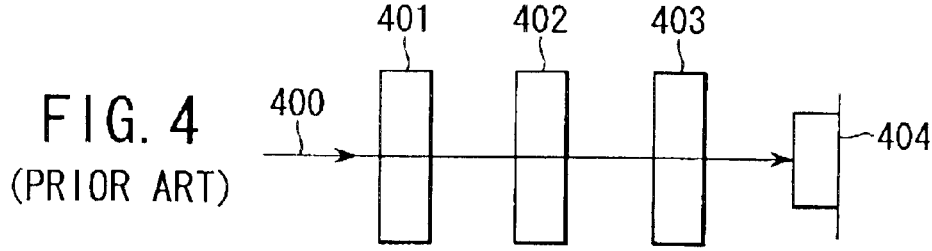
FIG. 4 is block diagram showing a chart for explaining a time analysis method conventionally used in a polarization analyzer.

Accordingly, as shown by A, C, D, B, A, C, D, B in FIGS. 2A and 2B, by applying a magnetic field not smaller than the saturation magnetic field to each of the Faraday elements 108 and 109 and switching their directions, as shown in Equation (4), the light 100 to be measured can be polarized in four polarization states (A, B, C, D).

$$A(\phi, \theta) = A(22.5, 22.5)$$

$$B(22.5, -22.5)$$

$$C(-22.5, 22.5)$$

$$D(-22.5, -22.5) \tag{4}$$

In this case, the signal generator 117 should preferably output to the magnetic field generators 112 and 115 a control signal whose strength is sufficient to apply each of the Faraday elements 108 and 109, a magnetic field which is not smaller than the saturation magnetic field of each Faraday element 108 and 109 which are built in the two Faraday rotators 103 and 105, in the Faraday rotators 103 and 105 via the magnetic field generators 112 and 115. As a result, the rotational angle of the two Faraday rotators 103 and 105 is limited to multiples of the Faraday angle of each of the Faraday elements 108 and 109.

In addition, in these cases, the transmission rate of each of the Faraday elements 108 and 109 does not depend on the strength of the magnetic field and has a fixed value which is approximately 100% (refer to FIG. 6).

If the transmission rate of the wavelength plate 104 is seen as almost 100%, the relationship shown in Equation (5) is established.

$$T_2(\phi) T_q T(\theta) \cong 1 \tag{5}$$

Also, the retardation $\Delta$ of the wavelength plate 104 is 45° (that is, a $\lambda/8$ plate), and the incline $\alpha$ of the optical axis of the wavelength plate 104 is 0°. In this case, the Equation (3) of four polarization states of the above-mentioned A, B, C and D represent the relationship shown in Equation (6).

$$A = S_0'(\phi, \theta) = S_0'(22.5, 22.5) \tag{6}$$

$$= \frac{1}{2}\left\{S_0 + \left(\frac{1}{2} - \frac{1}{2\sqrt{2}}\right)S_1 - \left(\frac{1}{2} + \frac{1}{2\sqrt{2}}\right)S_2 - \frac{1}{2}S_3\right\}$$

$$B = S_0'(22.5, -22.5)$$

$$= \frac{1}{2}\left\{S_0 + \left(\frac{1}{2} + \frac{1}{2\sqrt{2}}\right)S_1 + \left(\frac{1}{2} - \frac{1}{2\sqrt{2}}\right)S_2 - \frac{1}{2}S_3\right\}$$

$$C = S_0'(-22.5, 22.5)$$

$$= \frac{1}{2}\left\{S_0 + \left(\frac{1}{2} + \frac{1}{2\sqrt{2}}\right)S_1 - \left(\frac{1}{2} - \frac{1}{2\sqrt{2}}\right)S_2 + \frac{1}{2}S_3\right\}$$

$$D = S_0'(-22.5, -22.5)$$

$$= \frac{1}{2}\left\{S_0 + \left(\frac{1}{2} - \frac{1}{2\sqrt{2}}\right)S_1 + \left(\frac{1}{2} + \frac{1}{2\sqrt{2}}\right)S_2 + \frac{1}{2}S_3\right\}$$

By solving the Equation (6), the Stokes parameters Si (i=0, 1, 2, 3) which indicate the polarization state of the light 100 to be measured which is represented by a relationship such as that shown in Equation (7) can be computed.

$$\begin{bmatrix} S_0 \\ S_1 \\ S_2 \\ S_3 \end{bmatrix} = \begin{bmatrix} \frac{\sqrt{2}+1}{2} & \frac{-\sqrt{2}+1}{2} & \frac{-\sqrt{2}+1}{2} & \frac{\sqrt{2}+1}{2} \\ -\sqrt{2} & \sqrt{2} & \sqrt{2} & -\sqrt{2} \\ -1 & 1 & -1 & 1 \\ 2-\sqrt{2} & 2+\sqrt{2} & -2-\sqrt{2} & -2+\sqrt{2} \end{bmatrix} \begin{bmatrix} A \\ B \\ C \\ D \end{bmatrix} \tag{7}$$

The above series of computations are processed in the signal processor 16.

In this case, the signal processor 16 sequentially determines whether the polarization state of the light being measured is one of the four polarization states (A, B, C, D), using the electric signal from the signal generator 117 shown in FIG. 1. By substituting the light receiving electric signals of the optical receiver 107 in each of the four polarization states, the Stokes parameters Si (i=0, 1, 2, 3) which indicate the polarization state of the light 100 to be measured.

Equations (6) and (7) are the results in the case where the retardation $\Delta$ of the wavelength plate 104 is 45°, and the Faraday angle of each of the Faraday elements 108 and 109 is 22.5°.

However, in the case where the Faraday angle and the like have values which are different from these, if the Faraday angle of each of the Faraday elements 108 and 109 and the retardation $\Delta$ of the wavelength plate 104 and the like are measured precisely, and the measured values are substituted in the Equation (2), the Stokes parameters Si (i=0, 1, 2, 3) which indicate the polarization state of the light 100 to be measured can be more accurately computed.

In the embodiment described above, the light transmitted from the polarizer 106 is directly received by the optical receiver 107.

However, the light transmitted from the polarizer 106 may be first made incident on a fiber which is not shown, and then the light emitted from the fiber may be received by the optical receiver 107.

(Second Embodiment)

The above described embodiment is an example of the case in which 2 Faraday rotators are used, but even if 3 Faraday rotators are used, the Stokes parameters Si (i=0, 1, 2, 3) which indicate the polarization state of the light 100 to be measured can be determined in the same manner as that described above.

The following describes the outline of a second embodiment of the present invention in which 3 Faraday Rotators are used.

Figure 8:
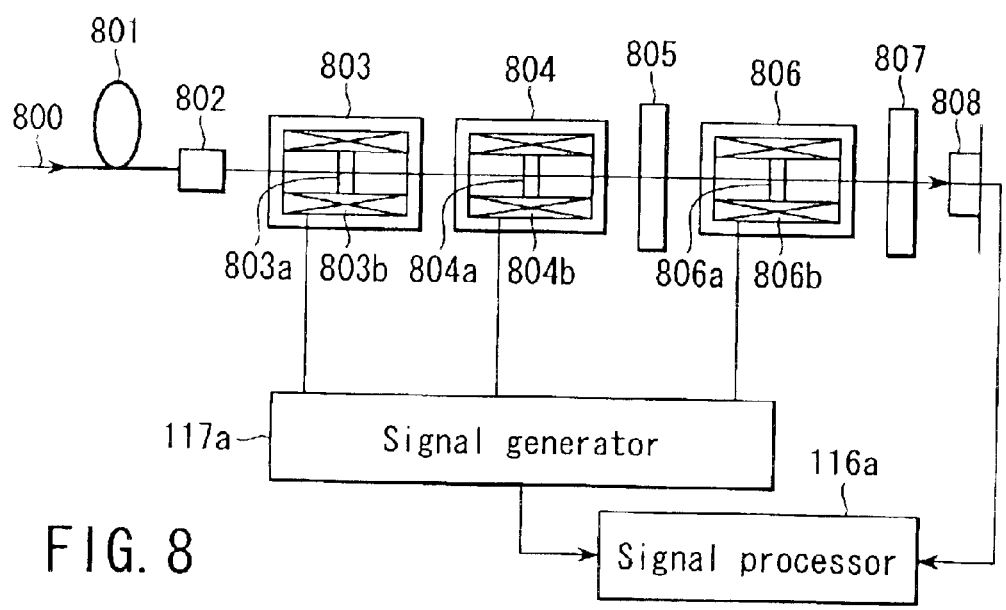
FIG. 8 is a block diagram showing a structure of an optical system of a polarization analyzer using 3 Faraday rotators according to a second embodiment of the present invention.

FIG. 8 is a block diagram showing the structure of the main portions of a polarization analyzer according to the second embodiment of the present invention which uses 3 Faraday rotators 803, 804 and 806.

That is, as shown in FIG. 8, light 800 to be measured which is entered by a fiber 801 is collimated by a collimator lens 802, and after being transmitted through a first Faraday rotator 803, a second Faraday rotator 804, a wavelength plate 805, a third Faraday rotator 806, and a polarizer 807 is received at an optical receiver 808.

In this embodiment, all of the Faraday rotators 803, 804 and 806 respectively include Faraday elements 803a, 804a and 806a having a Faraday angle of 22.5°, and magnetic field generator coils (magnetic field generators) 803b, 804b and 806b in the same manner as in FIG. 1.

Also, in this embodiment, inner details of the drawing have been omitted, but this embodiment also includes the signal generator 117a and the signal processor 116a which are provided in the case of FIG. 1.

However, the rectangular voltage signal having a frequency of f which is generated from the rectangular wave signal generator (not shown) of the signal generator 117a is branched into a first rectangular wave voltage signal, a second rectangular voltage signal, and a third rectangular voltage signal, and supplied to each of the magnetic field generator coils (magnetic field generators) 803b, 804b and 806b.

In this case, the total of a rotational angle θ1 of the first Faraday rotator 803 and a rotational angle θ2 of the second Faraday rotator 804 is equivalent to the rotational angles θ of Equations (1) and (2).

In addition, if a magnetic field is applied to both the first Faraday rotator 803 and the second Faraday rotator 804 in a direction that is parallel or opposite to the parallel direction of the optical axis, θ has the following three values.

$$\theta=45° (\theta1=22.5°, \theta2=22.5°)$$

$$\theta=0° (\theta1=22.5°, \theta2=-22.5° \text{ or } \theta1=-22.5°, \theta2=22.5°)$$

$$\theta=45° (\theta1=-22.5°, \theta2=-22.5°)$$

In addition, because φ can obtain the value of ±22.5, in this system the light to be measured can be polarized in a total of 6 polarization states (A, B, C, D, E, F).

Also, the retardation Δ of the wavelength plate 805 is 45° (that is a λ/8 plate), and the incline α of the optical axis of the wavelength plate 805 is 0°.

In this case, the relationship between the amount of light received at the optical receiver 808 for each of the polarization states (A, B, C, D, E, F) and the Stokes parameters which indicate the polarization states of the light 800 to be measured is shown in Equation (8).

$$A = A(\phi, \theta) = A(-22.5, 0) = \frac{1}{2}\left(S_0 + \frac{S_1}{\sqrt{2}} + \frac{S_3}{\sqrt{2}}\right) \quad (8)$$

$$B = B(-22.5, -45) = \frac{1}{2}\left(S_0 + \frac{S_2}{\sqrt{2}} + \frac{S_3}{\sqrt{2}}\right)$$

$$C = C(-22.5, 45) = \frac{1}{2}\left(S_0 - \frac{S_2}{\sqrt{2}} + \frac{S_3}{\sqrt{2}}\right)$$

$$D = D(22.5, 0) = \frac{1}{2}\left(S_0 + \frac{S_2}{\sqrt{2}} - \frac{S_3}{\sqrt{2}}\right)$$

$$E = E(22.5, -45) = \frac{1}{2}\left(S_0 + \frac{S_2}{\sqrt{2}} - \frac{S_3}{\sqrt{2}}\right)$$

$$F = F(22.5, 45) = \frac{1}{2}\left(S_0 - \frac{S_2}{\sqrt{2}} - \frac{S_3}{\sqrt{2}}\right)$$

Here, when the Stokes parameters which indicate the polarization states of the light 800 to be measured is determined, 4 equations are sufficient and thus, for example if A, B, C and D are used, the Stokes parameters Si (i=0, 1, 2, 3) which indicate the polarization states of the light 800 to be measured can be determined by Equation (9).

$$\begin{bmatrix} S_0 \\ S_1 \\ S_2 \\ S_3 \end{bmatrix} = \begin{bmatrix} 1 & 1 & 1 & -1 \\ 0 & -\sqrt{2} & -\sqrt{2} & 2\sqrt{2} \\ 0 & \sqrt{2} & -\sqrt{2} & 0 \\ \sqrt{2} & 0 & 0 & -\sqrt{2} \end{bmatrix} \begin{bmatrix} A \\ B \\ C \\ D \end{bmatrix} \quad (9)$$

Of course, the Stokes parameters Si (i=0, 1, 2, 3) which indicate the polarization states of the light 800 to be measured can be obtained in the same manner even if B, C, D and E is used in place of A, B, C and D.

In addition to this, by carrying out statistical processing including the Stokes parameters which indicate the polarization states of the light 800 to be measured which has been determined from various combinations of polarization states, it is possible for the measuring accuracy as a polarization analyzer to be improved.

Further, in the case where the Faraday angle of each of the Faraday elements built in the first Faraday rotator 803 and the second Faraday rotator 804 are different, or in the case where the number of Faraday elements are different, for example in the case where θ1=22.5°, θ2=45°, the four values become 67.5°, 22.5°, -22.5° and -67.5°.

Accordingly, in this case, the light 800 to be measured can be polarized in a total of 8 different polarization states (A, B, C, D, E, F, G, H).

In this case too, by combining any 4 of the 8 different polarization states (A, B, C, D, E, F, G, H), the Stokes parameters Si (i=0, 1, 2, 3) which indicate the polarization states of the light 800 to be measured, can be determined.

Further, by carrying out statistical processing including the Stokes parameters which indicate the polarization states of the light 800 to be measured which has been determined from various combinations of polarization states, it is possible for the measuring accuracy as a polarization analyzer to be improved.

(Third Embodiment)

The above described embodiment is an example of the case in which 3 Faraday rotators are used, but even if 4 Faraday rotators are used, the Stokes parameters Si (i=0, 1, 2, 3) which indicate the polarization state of the light to be measured can be determined in the same manner as that described above.

The following describes the outline of a third embodiment of the present invention in which 4 Faraday Rotators are used.

FIG. 9 is a block diagram showing the structure of the main portions of a polarization analyzer according to the third embodiment of the present invention which uses 4 Faraday rotators 903, 904, 906 and 907.

That is to say, as shown in FIG. 9, light 900 to be measured which is entered by a fiber 901 is collimated by a collimator lens 902, and after being transmitted through a first Faraday rotator 903, a second Faraday rotator 404, a wavelength plate 905, a third Faraday rotator 906, a fourth Faraday rotator 907, and a polarizer 908 is received at an optical receiver 909.

In this embodiment, all of the Faraday rotators 903, 904, 906 and 907 respectively include Faraday elements 903a, 904a, 906a and 907a having a Faraday angle of 22.5°, and magnetic field generator coils (magnetic field generators) 903b, 904b, 906b, and 907b in the same manner as in FIG. 1.

Also, in this embodiment, inner details of the drawing have been omitted, but this embodiment also includes the signal generator 117b and the signal processor 116b as in the case of FIG. 1.

However, the rectangular voltage signal having a frequency of f which is generated from the rectangular wave signal generator (not shown) of the signal generator 117b is branched into a first rectangular wave voltage signal, a second rectangular voltage signal, a third rectangular voltage signal and a fourth rectangular wave voltage signal, and supplied to each of the magnetic field generator coils (magnetic field generators) 903b, 904b, 906b and 907b.

In addition, in this embodiment also, as in the second embodiment described above, the Stokes parameters Si (i=0, 1, 2, 3) which indicate the polarization states of the light 900 to be measured can be determined.

(Other Embodiments)

It is to be noted that even in the case where 5 or more Faraday rotators are used, the Stokes parameters Si (i=0, 1, 2, 3) which indicate the polarization states of the light to be measured can be determined in the same manner in the second and third embodiments described above.

Also, in the embodiments described above, in each of the Faraday rotators, a magnetic field which is not smaller than the saturation magnetic field is applied to each of the Faraday elements in a direction which is parallel or opposite to the parallel direction, to the optical axis and the light to be measured is thereby rotated.

However, even in the case where a magnetic field not larger than the saturation magnetic field of each of the Faraday elements is applied, if the transmission rate of each of the Faraday elements is accurately known beforehand, by using Equation (2), the Stokes parameters which indicate the polarization states of the light to be measured can be computed.

Also, as shown in FIG. 10, even when a Faraday rotator 1002 which is used is disposed such that the direction of a magnetic field which is applied from a magnetic field generator coil (magnetic field generator) 1003 to a Faraday element 1001 of the Faraday rotator 1002, is inclined at a predetermined angle from the direction parallel to the optical axis thereof, if the rotational angle of the Faraday element 1001 is known, similarly by using Equation (2), the Stokes parameters which indicate the polarization states of the light to be measured can be computed.

Further, as shown in FIG. 11, even a rotation magnetic field type Faraday rotator 1004 is used as the Faraday rotator, the Stokes parameters which indicate the polarization states of the light can be computed.

That is, in the rotation magnetic field type Faraday rotator 1004, magnetic fields Hx and Hy are applied from both the horizontal and vertical directions by a horizontal magnetic field generator coil 1102 and a vertical magnetic field generator coil 1103 to a Faraday element 1101, and a combined magnetic field strength H $(=\sqrt{Hx^2+Hy^2})$ is not smaller than the saturation magnetic field.

In addition, by adjusting each of the magnetic fields Hx and Hy, the direction of the combined magnetic field may be rotated.

In this case, if the Faraday angle is ηS, the rotational angle η of the rotation magnetic field type Faraday rotator can be expressed as:

$$\eta = (Hx/H)\eta S.$$

As described in the above, the polarization analyzer of the present invention rotates the polarization of the light to be measured with the Faraday rotator using the Faraday element and the wavelength plate, and measures light amount of the light to be measured after it is transmitted through a polarizer. Then, the polarization state of the light to be measured is measured from the amount of polarization rotation and the light amount. As a result it becomes possible for the Stokes parameters which indicate the polarization states of the light to be measured to be computed with high accuracy, high sensitivity and high speed without splitting the light to be measured, and thus the polarization states of this light can be measured.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A polarization analyzer comprising:
a plurality of Faraday rotators which are serially disposed on an optical axis onto which light to be measured is incident, and each have a Faraday element which rotates the light to be measured and a magnetic field generator which applies a magnetic field to the Faraday element;
a wavelength plate which is disposed between said plurality of Faraday rotators, and retards the light to be measured;
a polarizer which transmits, of the light to be measured, light having a predetermined plane of polarization, which has been rotated by said plurality of Faraday rotators, and retarded by the wavelength plate;
an optical receiver which receives the light transmitted by the polarizer and outputs a light receiving electric signal in accordance with the amount of light received;
a signal generator which outputs a control signal for polarizing the light to be measured into at least four polarization states to the magnetic field generator; and
a signal processor which determines Stokes parameters which indicate the polarization state of the light to be measured based on the four polarization states, and the light receiving electric signal from the optical receiver corresponding to each of the four polarization states.

2. The polarization analyzer according to claim 1, wherein the signal generator outputs control signals having sufficient strength to apply to each Faraday element, a magnetic field not smaller than the saturation magnetic field of each Faraday element built in said plurality of Faraday rotators, in said plurality of Faraday rotators via the magnetic field generator.

3. The polarization analyzer according to claim 1, wherein the signal generator outputs control signals having sufficient strength to apply to each Faraday element, a magnetic field whose direction is parallel to the optical axis or opposite to the parallel direction thereof, and which is not smaller than the saturation magnetic field of each Faraday element built in said plurality of Faraday rotators, in said plurality of Faraday rotators via the magnetic field generator, and thus each rotational angle of said plurality of Faraday rotators is limited to multiples of a Faraday angle of each Faraday element.

4. The polarization analyzer according to claim 1, wherein the direction of a magnetic field which is applied from a magnetic field generator to a Faraday element built in at least one of said plurality of Faraday rotators is disposed so as to be inclined at a predetermined angle which is parallel to the optical axis.

5. The polarization analyzer according to claim 1, wherein said at least one of said plurality of Faraday rotators is formed as a rotation magnetic field type Faraday rotator.

6. The polarization analyzer according to claim 5, wherein the rotation magnetic field type Faraday rotator includes a Faraday element, a horizontal magnetic field generator coil which applies a magnetic field from a horizontal direction to the Faraday element, and a vertical magnetic field generator coil which applies a magnetic field from a vertical direction to the Faraday element, and by adjusting the magnetic field from the horizontal direction and the magnetic field from the vertical direction, rotation is possible in the direction of the combined magnetic field.

7. A polarization analyzer comprising:
first and second Faraday rotators which are serially disposed on an optical axis onto which light to be measured is incident, and each have a Faraday element which rotates the light to be measured and a magnetic field generator which applies a magnetic field to the Faraday element;

a wavelength plate which is disposed between the first and second Faraday rotators, and retards the light to be measured;

a polarizer which transmits, of the light to be measured, light having a predetermined plane of polarization, which has been rotated by the first and second Faraday rotators, and retarded by the wavelength plate;

an optical receiver which receives the light transmitted by the polarizer and outputs a light receiving electric signal in accordance with the amount of light received;

a signal generator which outputs a control signal for polarizing the light to be measured into at least four polarization states to the magnetic field generator; and a signal processor which determines Stokes parameters which indicate the polarization state of the light to be measured, based on the four polarization states, and the light receiving electric signal from the optical receiver corresponding to each. of the four polarization states.

8. The polarization analyzer according to claim 7, wherein the signal generator outputs control signals having sufficient strength to apply to each Faraday element, a magnetic field not smaller than the saturation magnetic field of each Faraday element built inside the first and second Faraday rotators, in the first and second Faraday rotators via the magnetic field generator.

9. The polarization analyzer according to claim 7, wherein the signal generator outputs control signals having sufficient strength to apply to each Faraday element, a magnetic field whose direction is parallel to the optical axis or opposite to the parallel direction thereof and is not smaller than the saturation magnetic field of each Faraday element built in the two Faraday rotators in the first and second Faraday rotators via the magnetic field generator, and thus each rotational angle of the first and second Faraday rotators is limited to multiples of a Faraday angle of each Faraday element.

10. The polarization analyzer according to claim 7, wherein the signal generator includes a rectangular wave signal generator, a phase retarder, an amplifier for a first Faraday rotator, and an amplifier for a second Faraday rotator, a rectangular wave voltage signal having a predetermined frequency which is generated from the rectangular wave signal generator is split into a first rectangular wave voltage signal and a second rectangular wave voltage signal, the first rectangular wave voltage signal after being amplified at the amplifier for the first Faraday rotator is applied to a first Faraday rotator magnetic field generator coil as the magnetic field generator which is built in the first Faraday rotator, the second rectangular wave voltage signal after being amplified at the amplifier for the second Faraday rotator via the phase retarder which carries out a 90° phase retardation, is applied to a second Faraday rotator magnetic field generator coil which is built in the second Faraday rotator.

11. The polarization analyzer according to claim 7, wherein the direction of a magnetic field which is applied from a magnetic field generator to a Faraday element built in at least one of the first and second Faraday rotators is disposed so as to be inclined at a predetermined angle which is parallel to the optical axis.

12. The polarization analyzer according to claim 7, wherein said at least one of the first and second Faraday rotators is formed as a rotation magnetic field type Faraday rotator.

13. The polarization analyzer according to claim 12, wherein the rotation magnetic field type Faraday rotator includes a Faraday element, a horizontal magnetic field generator coil which applies a magnetic field from a horizontal direction to the Faraday element, and a vertical magnetic field generator coil which applies a magnetic field from a vertical direction to the Faraday element, and by adjusting the magnetic field from the horizontal direction and the magnetic field from the vertical direction, rotation is possible in the direction of the combined magnetic field.

14. A polarization analyzer comprising:

first, second and third Faraday rotators which are serially disposed on an optical axis onto which light to be measured is incident, and each have a Faraday element which rotates the light to be measured and a magnetic field generator which applies a magnetic field to the Faraday element;

a wavelength plate which is disposed between the second and third Faraday rotators, and retards the light to be measured;

a polarizer which transmits, of the light to be measured, light having a predetermined plane of polarization, which has been rotated by the first, second and third Faraday rotators, and retarded by the wavelength plate;

an optical receiver which receives the light transmitted by the polarizer and outputs a light receiving electric signal in accordance with the amount of light received;

a signal generator which outputs a control signal for polarizing the light to be measured into at least four polarization states to the magnetic field generator; and a signal processor which determines Stokes parameters which indicate the polarization state of the light to be measured, based on the four polarization states, and the light receiving electric signal from the optical receiver corresponding to each of the four polarization states.

15. The polarization analyzer according to claim 14, wherein the signal generator outputs control signals having sufficient strength to apply to each Faraday element, a magnetic field not smaller than the saturation magnetic field of each Faraday element built in the first, second and third Faraday rotators, in the first, second and third Faraday rotators via the magnetic field generator.

16. The polarization analyzer according to claim 14, wherein the signal generator outputs control signals having sufficient strength to apply to each Faraday element, a magnetic field whose direction is parallel to the optical axis or opposite to the parallel direction thereof, and which is not smaller than the saturation magnetic field of each Faraday element built in the Faraday rotators in the first, second and third Faraday rotators, in the first, second and third Faraday rotators via the magnetic field generator, and thus each rotational angle of the first second and third Faraday rotators is limited to multiples of a Faraday angle of each Faraday element.

17. The polarization analyzer according to claim 14, wherein the direction of a magnetic field which is applied from a magnetic field generator to a Faraday element built in at least one of the first, second and third Faraday rotators is disposed so as to be inclined at a predetermined angle which is parallel to the optical axis.

18. The polarization analyzer according to claim 14, wherein said at least one of the first, second and third Faraday rotators is formed as a rotation magnetic field type Faraday rotator.

19. The polarization analyzer according to claim 18, wherein the rotation magnetic field type Faraday rotator includes a Faraday element, a horizontal magnetic field generator coil which applies a magnetic field from a horizontal direction to the Faraday element, and a vertical magnetic field generator coil which applies a magnetic field from a vertical direction to the Faraday element, and by adjusting the magnetic field from the horizontal direction and the magnetic field from the vertical direction, the direction of the combined magnetic field can be rotated.

20. A polarization analyzer comprising:
   first, second, third and fourth Faraday rotators which are serially disposed on an optical axis onto which light to be measured is incident, and each have a Faraday element which rotates the light to be measured and a magnetic field generator which applies a magnetic field to the Faraday element;
   a wavelength plate which is disposed between the second and third Faraday rotators, and retards the light to be measured;
   a polarizer which transmits, of the light to be measured, light having a predetermined plane of polarization, which has been rotated by the first, second, third and fourth Faraday rotators, and retarded by the wavelength plate;
   an optical receiver which receives the light transmitted by the polarizer and outputs a light receiving electric signal in accordance with the amount of light received;
   a signal generator which outputs a control signal for polarizing the light to be measured into at least four polarization states to the magnetic field generator; and
   a signal processor which determines Stokes parameters which indicate the polarization state of the light to be measured, based on the four polarization states, and the light receiving electric signal from the optical receiver corresponding to each of the four polarization states.

21. The polarization analyzer according to claim 20, wherein the signal generator outputs control signals having sufficient strength to apply to each Faraday element, a magnetic field not smaller than the saturation magnetic field of each Faraday element built in the first, second, third and fourth Faraday rotators, in the first, second, third and fourth Faraday rotators via the magnetic field generator.

22. The polarization analyzer according to claim 20, wherein the signal generator outputs control signals having sufficient strength to apply to each Faraday element, a magnetic field whose direction is parallel to the optical axis or opposite to the parallel direction thereof, and which is not smaller than the saturation magnetic field of each Faraday element built in the Faraday rotators in the first, second, third and fourth Faraday rotators in the first, second, third and fourth Faraday rotators via the magnetic field generator, and thus each rotational angle of the first second and third and fourth Faraday rotators is limited to multiples of a Faraday angle of each Faraday element.

23. The polarization analyzer according to claim 20, wherein the direction of a magnetic field which is applied from a magnetic field generator to a Faraday element built in at least one of the first, second, third and fourth Faraday rotators is disposed so as to be inclined at a predetermined angle which is parallel to the optical axis.

24. The polarization analyzer according to claim 20, wherein said at least one of the first, second, third and fourth Faraday rotators is formed as a rotation magnetic field type Faraday rotator.

25. The polarization analyzer according to claim 24, wherein the rotation magnetic field type Faraday rotator includes a Faraday element, a horizontal magnetic field generator coil which applies a magnetic field from a horizontal direction to the Faraday element, and a vertical magnetic field generator coil which applies a magnetic field from a vertical direction to the Faraday element, and by adjusting the magnetic field from the horizontal direction and the magnetic field from the vertical direction, rotation is possible in the direction of the combined magnetic field.

* * * * *